United States Patent
Shoho et al.

(10) Patent No.: US 6,690,643 B1
(45) Date of Patent: Feb. 10, 2004

(54) METHOD OF REROUTING CONNECTION IN MULTIPOINT CONNECTION

(75) Inventors: Tatsuya Shoho, Shin-yokohama (JP); Yasuhiko Uchida, Shin-yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/082,831

(22) Filed: May 21, 1998

(30) Foreign Application Priority Data

Jul. 30, 1997 (JP) ............................................. 9-204023

(51) Int. Cl.[7] ............................. H04J 3/14; H04J 3/26; H04L 12/28; H04L 12/56; H04L 1/22
(52) U.S. Cl. ........................ 370/216; 370/218; 370/397; 370/410; 370/432; 714/2
(58) Field of Search ................................ 370/432, 400, 370/410, 395–399, 216, 218, 395.1, 395.3, 409; 714/748, 749

(56) References Cited

U.S. PATENT DOCUMENTS 5,537,414 A * 7/1996 Takiyasu et al. ............ 714/749

FOREIGN PATENT DOCUMENTS

JP 4137905 10/1979

* cited by examiner

Primary Examiner—Wellington Chin
Assistant Examiner—Maikhanh Tran
(74) Attorney, Agent, or Firm—Katten Muchin Zavis Rosenman

(57) ABSTRACT

In a communication network system that is capable of multipoint connection from one switch to a plurality of other switches, to provide an efficient method of rerouting connection in multipoint connection. There is provided a method of rerouting connection, if there is a first other switch that cannot receive multipoint connection request information from the one switch, the method comprising the steps of: receiving in a second other switch first multipoint connection request information sent from the one switch; generating in the second other switch second multipoint connection request information to the first other switch by using the first multipoint connection request information; sending the second multipoint connection request information generated in the second other switch to the first other switch; and performing prescribed multipoint connection processing in the first other switch by using the second multipoint connection request information sent from the second other switch.

14 Claims, 21 Drawing Sheets

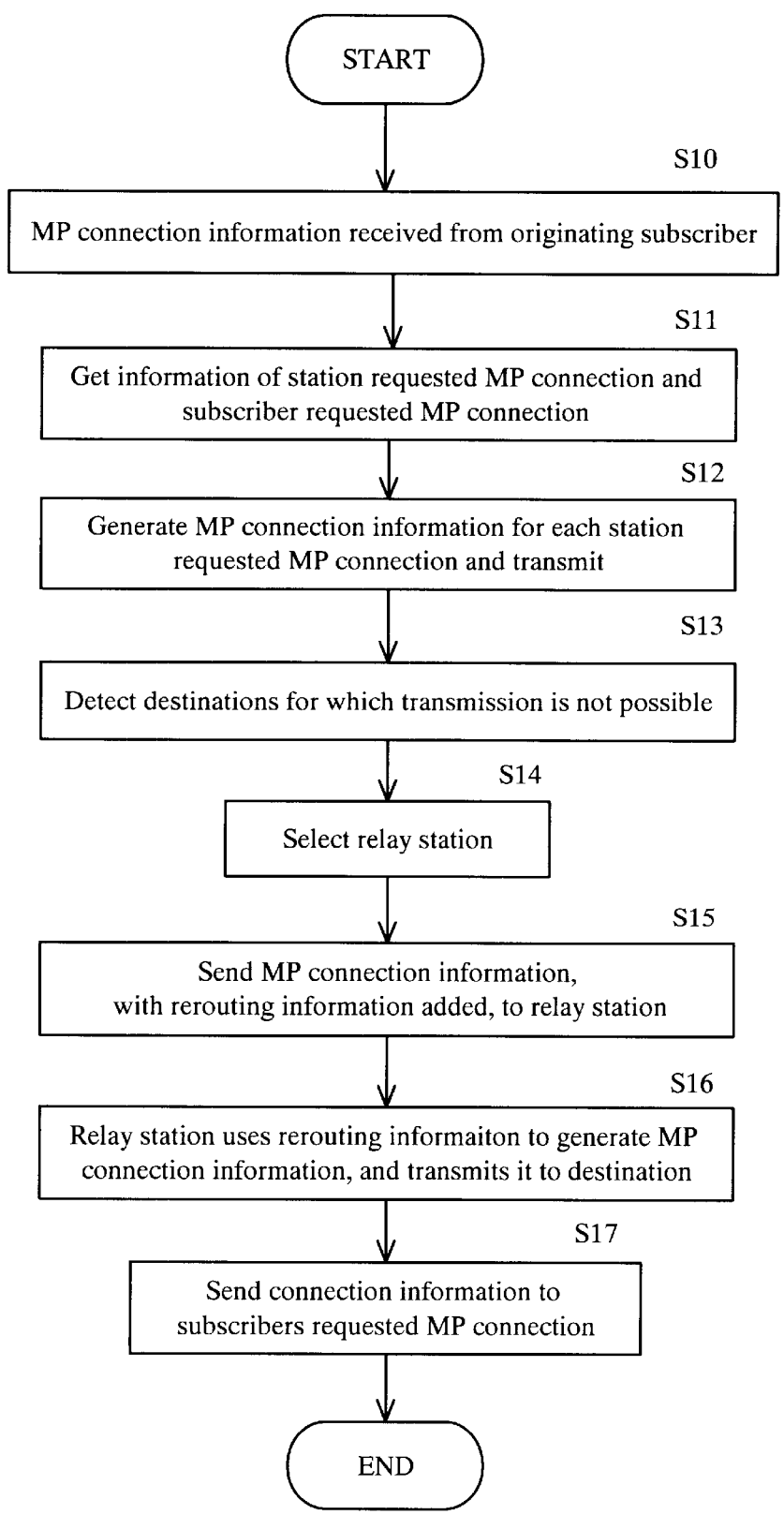

a-Sub

Station A

F1 Multi-connection information

ID=xxx

Station B b-Sub / c-Sub

Station C d-Sub / e-Sub

FIG. 3A
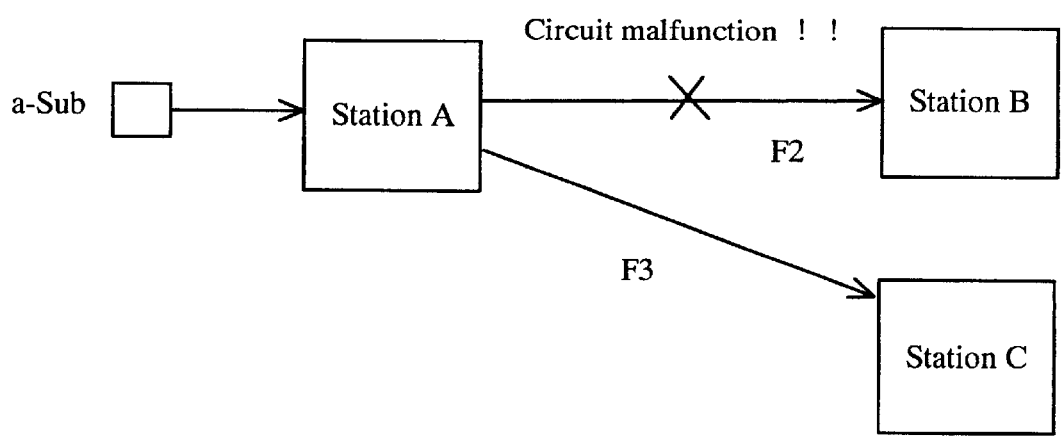
FIG. 3B
F2 Multipoint connection request information
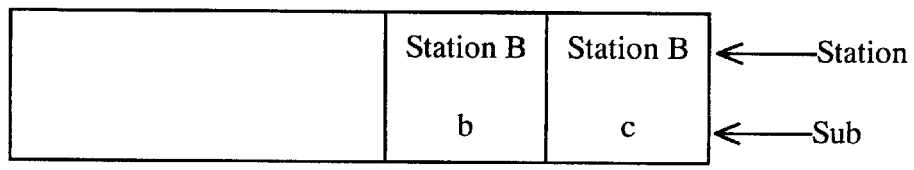
F3 Multipoint connection request information
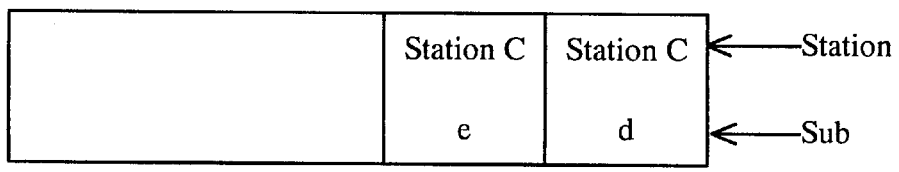

F4 Multipoint connection request information

F18 Rerouting information

F5 Multipoint connection request information

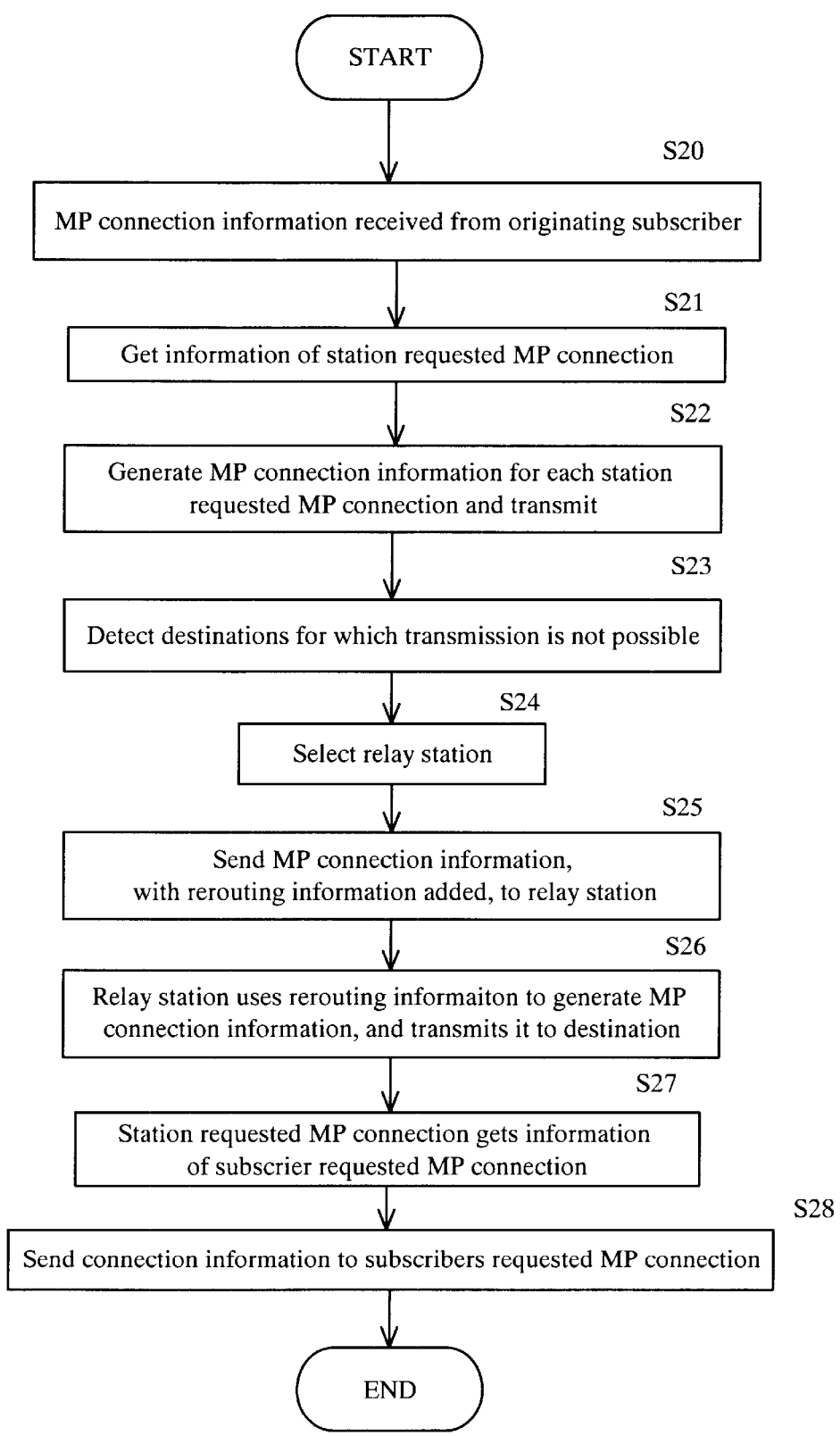

F6 Multi-connection information

FIG. 9A
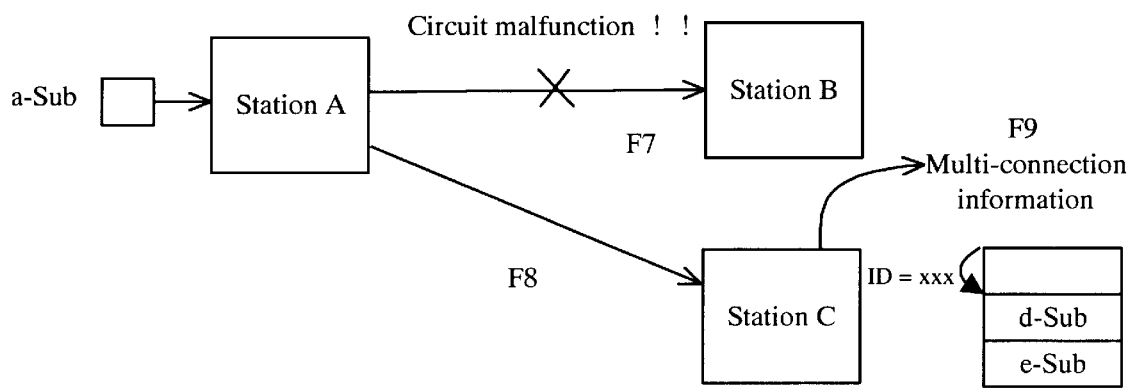
FIG. 9B
F7 Multipoint connection request information
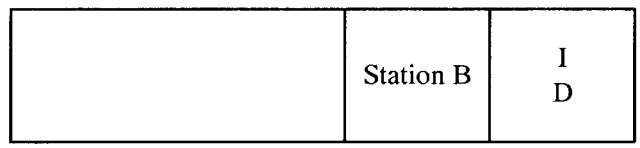
F8 Multipoint connection request information
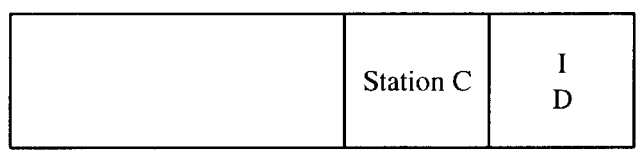

F10 Multipoint connection request information

F19 Rerouting information

F11 Multipoint connection request information

F14 Multipoint connection request information

F15 Rerouting notification information

METHOD OF REROUTING CONNECTION IN MULTIPOINT CONNECTION

BACKGROUND OF THE INVENTION

1. Field of the Invention

The present invention relates to a method of rerouting connection processing in a communication network system that is capable of multipoint connection to a plurality of subscribers accommodated between a plurality of ATM (Asynchronous Transfer Mode) switches in B-ISDN (Broadband Integrated Service Digital Network).

2. Description of the Related Art

Adoption of B-ISDN (Broadband Integrated Service Digital Network) incorporating ATM (Asynchronous Transfer Mode) technology is currently scheduled for the next-generation communication network. ATM is a system in which digital information that is to be transmitted is divided up into fixed lengths of 48 bytes in each case, to which is added respectively 5-byte control information called a "header", these being then transferred by hardware switching. FIG. 21 is a view showing a mode of connection in such B-ISDN. In B-ISDN, in addition to the one-to-one connection mode as in a conventional telephone network shown in FIG. 21A, communication is possible using a multipoint connection, in which the same information can be transmitted simultaneously to a plurality of locations as shown in FIG. 21B.

Specifically, in the case of the one-to-one connection shown in FIG. 21A, when a subscriber a-Sub accommodated on an ATM switching station A is connected with a subscriber b-Sub accommodated on an ATM switching station B, a virtual path (VP) $VP_{AB}$ is set up between station A and station B, and a single virtual channel (VC) $VC_{AB}$ is set up on this virtual path.

Also, in the case of multipoint connection as shown in FIG. 21B, when a connection is made from a subscriber a-Sub accommodated on an ATM switching station A to subscribers b-Sub and c-Sub accommodated on an ATM switching station B and subscribers d-Sub and e-Sub accommodated on an ATM switching station C, respective virtual paths (VP) $VP_{AB}$ and $VP_{AC}$ are set up between station A and station B and between station A and station C and, on these virtual paths $VP_{AB}$ and $VP_{AC}$, there are set up respectively a single virtual channel $VC_{AB}$ and $VC_{AC}$.

Let us suppose that, at this point, as shown in FIG. 21C, due to some reason such as a circuit malfunction, connection cannot be performed with station B. In such a case, conventionally, a virtual channel (VC) was set up between station A and station B by setting up a virtual channel $VC_{ACB}$ on the virtual path $VP_{AC}$ between station A and station C and the virtual path $VP_{CB}$ between station C and station B. By means of such rerouting connection processing, it was possible to send information from station A simultaneously to stations B and C.

However, the rerouting connection processing described above in fact resulted in setting up two virtual channels $VC_{AC}$ and $VC_{ACB}$ on the virtual path $VP_{AC}$ between stations A and C. Thus, if a plurality of virtual channels (VC) was set up on a given virtual path (VP), in cases where the data capacity of the transmitted information was large, such as in the case of image data, or where other virtual channels (VC), not shown, were additionally set up on this virtual path (VP), problems arose such as delayed information transmission, loss of transmission quality, and increased load on the ATM switch, because of exceeding the maximum bandwidth of the virtual path $VP_{AC}$ between stations A and C in FIG. 21C.

In particular, in the case where rerouting connection processing is performed in multipoint connection as described above, as in the case of the two virtual channels $VC_{AC}$ and $VC_{ACB}$ that are set up on the virtual path $VP_{AC}$ between station A and station C shown in FIG. 21C, the same information flows on the plurality of virtual channels (VC) of the same virtual path (VP), which is uneconomic. There is therefore a demand, in rerouting connection processing, to set up virtual channels (VC) that are set up on a virtual path (VP) in an efficient manner and to limit the bandwidth capacity of the virtual path (VP).

SUMMARY OF THE INVENTION

An object of the present invention is therefore to provide a method of efficient rerouting connection processing in multipoint connection in a communication network that is capable of multipoint connection.

In order to achieve this object, a method of rerouting connection according to the present invention, with a communication network system that is capable of multipoint connection from one switch to a plurality of other switches, if there is a first other switch that cannot receive multipoint connection request information from the one switch, comprises the steps of:

receiving in a second other switch first multipoint connection request information sent from the one switch;

generating in the second other switch second multipoint connection request information to the first other switch by using the first multipoint connection request information;

sending the second multipoint connection request information generated in the second other switch to the first other switch; and performing prescribed multipoint connection processing in the first other switch by using the second multipoint connection request information sent from the second other switch.

By the method of rerouting connection described above, the second multipoint connection request information to the first other switch is not sent from the one switch to the first other switch via the second other switch, but the second other switch generates the second multipoint connection information and sends this to the first other switch, so the capacity of the circuit that is set up between the one switch and the second switch can be restricted.

Also, in a method of rerouting connection according to the present invention preferably the first multipoint connection request information includes rerouting information, and in the generating step, the second other switch generates the second multipoint connection request information by using the rerouting information.

For example, the rerouting information includes information of a subscriber who has been requested multipoint connection and is accommodated on the first other switch.

In the case of above, in the generating step, the second other switch generates the second multipoint connection request information containing the information of the subscriber, and in the performing step ,the first other switch performs multipoint connection processing in respect of the subscriber by using the information of the subscriber.

The rerouting information may include information of the first other switch.

In the case of above, the first multipoint connection request information further includes identification information that identifies a subscriber that has been requested multipoint connection, in the generating step, the second other switch generates the second multipoint connection request information containing identification information, and in the performing step ,the first other switch gets information of the subscriber corresponding to the identification information from a data memory means of the first other switch and performs multipoint connection processing in respect of the subscriber by using the information of the subscriber.

Also, the method of rerouting connection of present invention may comprise the additional step of sending rerouting information for generating the second multipoint connection request information to a database that manages the communication network system from the one switch, and in the generating step, the second other switch gets rerouting information from the database and generates the second multipoint connection request information by using the rerouting information.

In such case, the first multipoint connection request information includes identification information that identifies a subscriber that has been requested multipoint connection, and in the generating step, the second other switch generates the second multipoint connection request information including the identification information, and in the performing step ,the first other switch gets the information of the subscriber corresponding to the identification information from the database and performs multipoint connection processing in respect of the subscriber by using the information of the subscriber.

Also, the switches in the present invention may be for example asynchronous transfer mode (ATM) switches.

BRIEF DESCRIPTION OF THE DRAWINGS

FIG. 1 is a flow chart of multipoint connection processing wherein rerouting connection processing is performed, constituting a first embodiment of the present invention;

FIG. 3 is a view given in explanation of rerouting connection processing according to the first embodiment of the present invention (number 2);

FIG. 7 is a flow chart of multipoint connection processing wherein rerouting connection processing according to a second embodiment of the present invention is performed;

FIG. 9 is a view given in explanation of rerouting connection processing according to the second embodiment of the present invention (number 2);

DESCRIPTION OF THE PREFERRED EMBODIMENTS

Figure 2A:
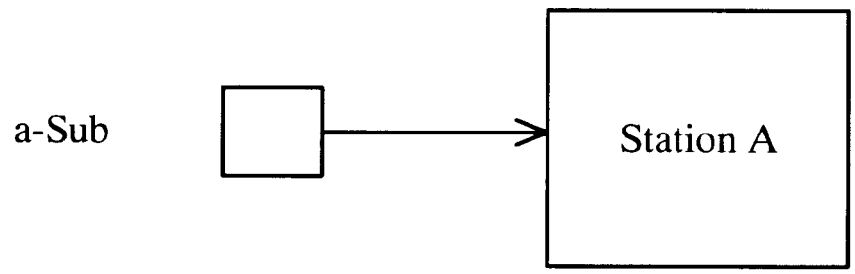
FIG. 2 is a view given in explanation of rerouting connection processing according to the first embodiment of the present invention (number 1)

Embodiments of the present invention are described below. However, the technical scope of the present invention is not restricted to these embodiments.

The communication network system whereby rerouting connection processing according to the present embodiment described below is performed is B-ISDN using for example ATM switches capable of multipoint connection. FIG. 1 is a flow chart of multipoint connection processing wherein rerouting connection processing according to a first embodiment of the present invention is performed. This flow chart will be described with reference to FIGS. 2 to 5.

In FIG. 1, when a given subscriber of a communication network originates sending of multipoint connection request information (hereinbelow called MP connection information), the MP connection information is received by the station on which this originating subscriber is accommodated (S10). For example, a subscriber a-Sub accommodated on station A, which is an ATM switch in B-ISDN, sends MP connection information to station A.

When it has received the MP connection information, station A uses this MP connection information to get the information of the station requested MP connection and subscriber requested MP connection (S11). In more detail, the MP connection information includes:

(1) Data size (bytes) of MP connection information;

(2) Identification information (ID information) indicating the multipoint connection destination;

(3) Number of stations requested MP connection for which multipoint connection is to be performed;

(4) Information of stations requested MP connection for which multipoint connection is to be performed;

(5) Originating subscriber number requesting multipoint connection;

(6) Number of subscribers requested MP connection requesting multipoint connection;

(7) Information of subscribers requested MP connection for which multipoint connection is to be made; and (8) Information such as the requested bandwidth value for passage of ATM cells needed for multipoint connection.

The ID information of (2) above consists in the information of the station requested MP connection including the number of the station requested MP connection of (4) above and the information for identifying the subscriber requested MP connection including the number of the subscriber requested MP connection of (7) above. If therefore the MP connection information includes the ID information (2), the items of information (4) and (7) need not be included.

Thus, the above items of information corresponding to the ID information (2) above are stored, as multi-connection information, in the means for data storage, not shown, that is managed by the switch (station); after receiving this ID information, the ATM switch (station) gets the aforesaid items of information by reading the multi-connection information corresponding to this ID information from the means for data storage.

Consequently, station A accesses the means for data storage, not shown, managed by station A when for example station A receives MP connection information having the ID information of (2) above. Thus, station A reads multi-connection information F1 as shown in FIG. 2B corresponding to the ID information i.e. addressed by the ID information and thereby gets the information of the subscriber requested MP connection.

Figure 2B:
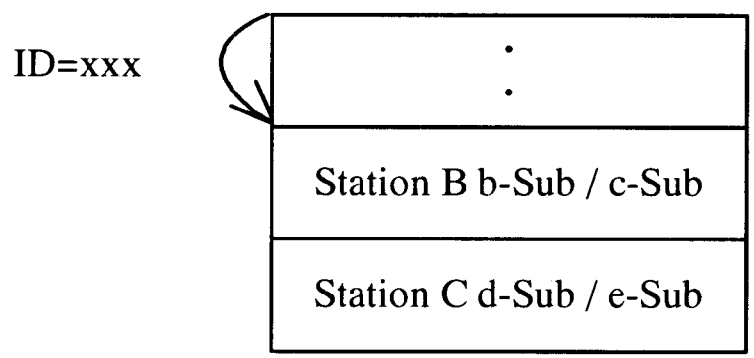

Let us assume that in this embodiment the station requested MP connection and the information of subscriber requested MP connection corresponding to the prescribed ID information is, for example as shown in the multi-connection information Fl of FIG. 2B, subscriber b-Sub and c-Sub accommodated at station B and subscribers d-Sub and e-Sub accommodated at station C.

Returning to FIG. 1, after the station has got the information of the station requested MP connection and subscriber requested MP connection, next, it generates the MP connection information to each station requested MP connection and sends this to the respective stations requested MP connection (S12). Specifically, as shown in FIG. 3A, once station A has received the MP connection information from subscriber a-Sub, using the information of the station requested MP connection and subscriber requested MP connection that it has acquired, it generates MP connection information including, for each station requested MP connection (in the Figure, respectively station B and station C), information as to the subscribers requested MP connection accommodated on each station, as shown in FIG. 3B, and sends these respectively to stations B and C. Specifically, the MP connection information F2 that is sent to station B contains the information of the subscriber requested MP connection accommodated in station B who are a subscriber b-Sub and a subscriber c-Sub, and the MP connection information F3 that is sent to station C contains the subscriber requested MP connection information of subscriber d-Sub and subscriber e-Sub.

Figure 21A:
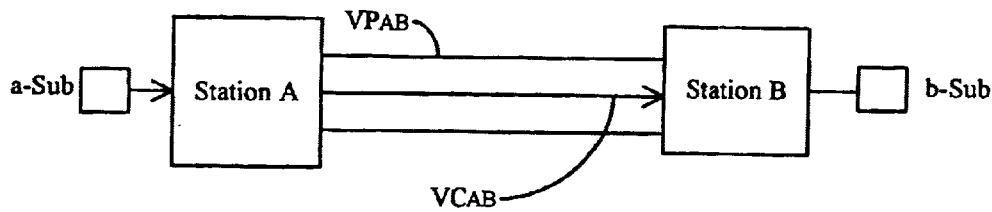
FIG. 21 is a view given in explanation of prior art rerouting connection processing.
Figure 21B:
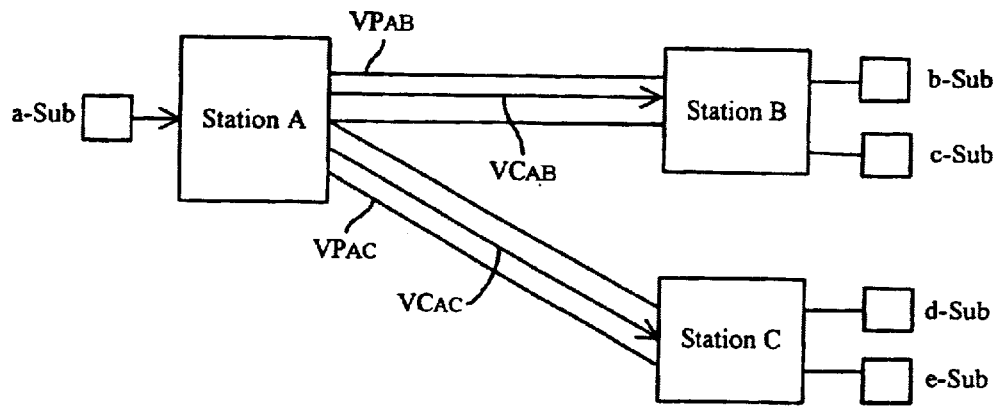

Thereupon, when the MP connection information F2, F3 have been normally sent from station A to the respective stations requested MP connection (station B and station C), each station requested MP connection, using the information of the subscriber requested MP connection containing the MP connection information that it has received, sends prescribed connection information to the subscribers requested MP connection accommodated at the respective station. In addition, at this point, as shown in FIG. 21B, respective virtual paths $VP_{AB}$ and $VP_{AC}$ are set up between station A and station B and between station A and station C, and respectively a single virtual channel $VC_{AB}$ or $VC_{AC}$ is set up thereon.

However, some stations requested MP connection may be unable to send MP connection information because of a circuit malfunction or the like. In such a case, as will be described below, in accordance with the present invention, rerouting connection processing is performed whereby the MP connection information is sent to a station requested MP connection that was not able to transmit, by using a station requested MP connection that was able to transmit normally as relay station.

Returning to FIG. 1, in step S13, if a station requested MP connection that was not able to send MP connection information due to a circuit malfunction or the like is detected, in step S14, the originating station selects as relay station a station requested MP connection that was able to transmit MP connection information normally. Specifically, as shown in FIG. 3A, if, because of a circuit malfunction or the like, MP connection information cannot be transmitted to station B, but can be transmitted to station C, station C is selected as relay station.

Figure 6:
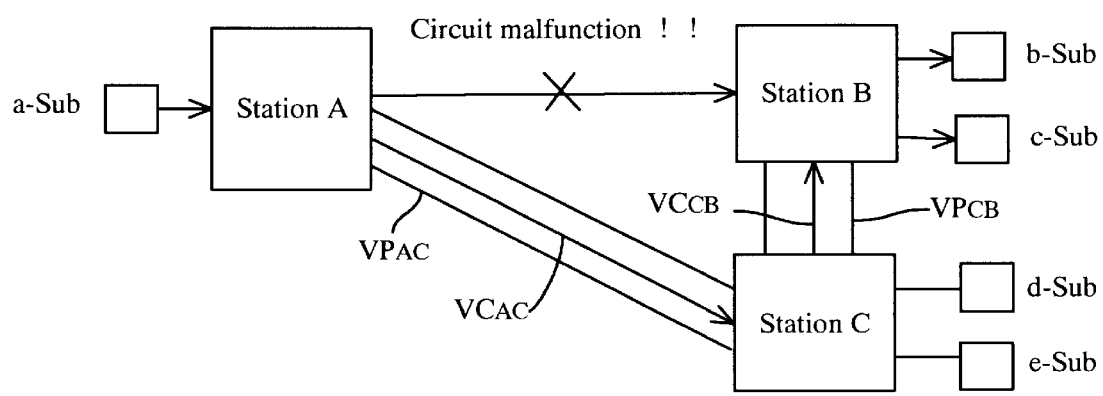
FIG. 6 is a view illustrating how a virtual path (VP) and virtual channel (VC) are set up in an embodiment of the present invention.

MP connection information F3 is then sent normally to station C. Consequently, the prescribed connection information is sent to subscribers requested MP connection (d-Sub and e-Sub) based on the information of the subscriber requested MP connection contained in MP connection information F3 and, in addition, as shown in FIG. 6, a virtual path $VP_{AC}$ is set up between station A and station C, and a single virtual channel $VC_{AC}$ is set up on it.

Figure 4A:
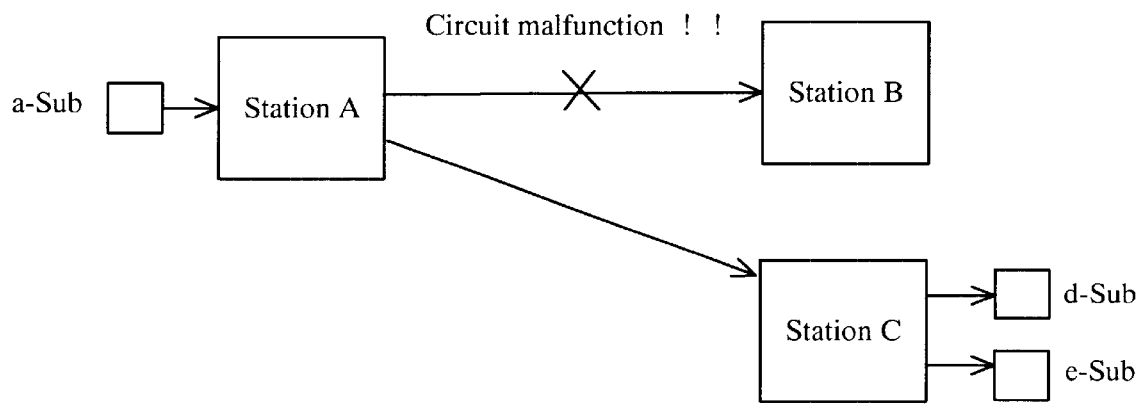
FIG. 4 is a view given in explanation of rerouting connection processing according to the first embodiment of the present invention (number 3)
Figure 4B:
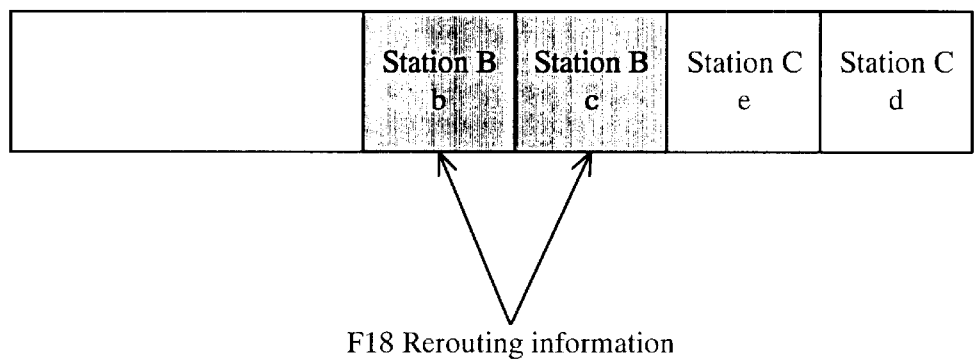

Then, in step S15, MP connection information to which has been added rerouting information for the sending of MP connection information from the relay station (station C) to the station requested MP connection (station B) that has not been able to send MP connection information is sent to the relay station (station C). Specifically, as shown in FIG. 4A, MP connection information F18 obtained by adding rerouting information F18 constituting the information of the subscriber requested MP connection (b-Sub and c-Sub) of the station requested MP connection (station B) which is the destination to MP connection information F3 as shown in FIG. 4B is sent by station A to station C, constituting the relay station.

Figure 5A:
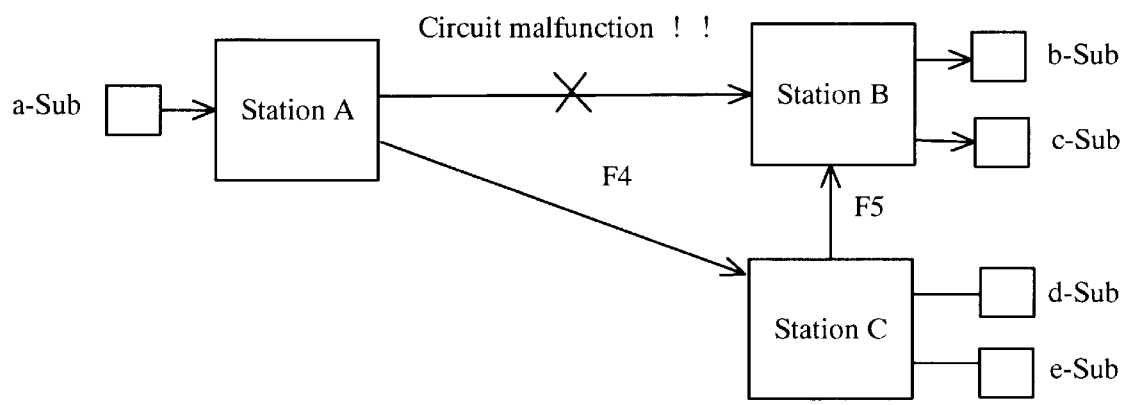
FIG. 5 is a view given in explanation of rerouting connection processing according to the first embodiment of the present invention (number 4)
Figure 5B:
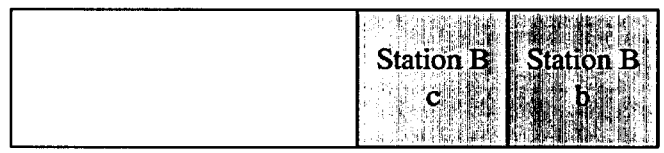

Next, in step S16, based on this rerouting information F18, the relay station (station C) generates MP connection information to the station requested MP connection (station B) that is the destination, and sends this to the station requested MP connection (station B) of the destination. Specifically, when it receives this MP connection information F4, station C, which is the relay station, from the number of the originating subscriber that requested the above multipoint connection (5) contained in this MP connection information F4, determines that this is MP connection information relating to the same multipoint connection as the MP connection information F3 that has already been sent. Then, station C extracts from this MP connection information F4 rerouting information F18 i.e. the information of the subscriber requested MP connection (subscriber b-Sub and subscriber c-Sub) of the destination requested MP connection (station B), and generates MP connection information F5 including the information of subscriber requested MP connection of subscriber b-Sub and subscriber c-Sub of station B as shown in FIG. 5B, and sends this to station B as shown in FIG. 5A.

Then, in step S17, the destination station requested MP connection (station B), using the information of the subscriber requested MP connection contained in the MP connection information that it has received, sends connection information to the subscribers requested MP connection. Specifically, after receiving MP connection information F5 normally, station B sends prescribed connection information to the subscribers requested MP connection (b-Sub and c-Sub) that are accommodated therein. At this point, as shown in FIG. 6, a virtual path $VP_{CB}$ and a single virtual channel $VC_{CB}$ are set up between the station C and station B.

Figure 21C:
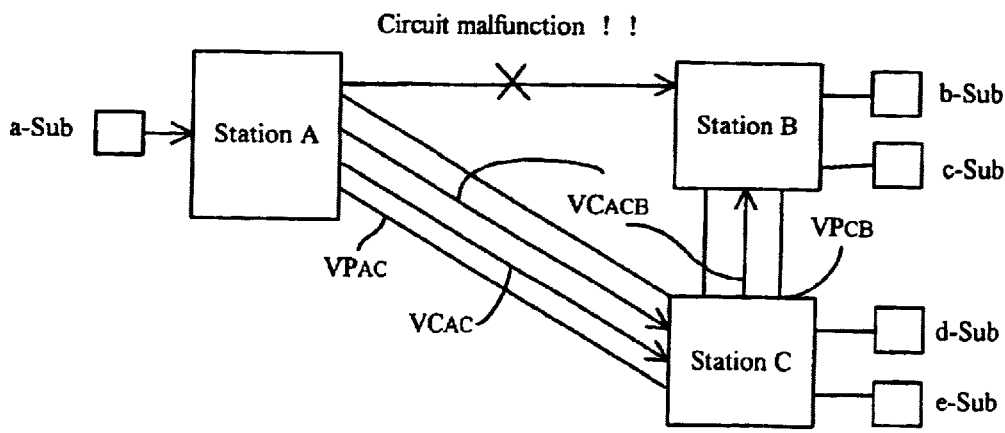

A characteristic in this embodiment of the present invention is that, when MP connection information F4 is received by station C, station C ascertains that this MP connection information F4 is MP connection information relating to the same multipoint connection as the MP connection information F3, so it does not set up a new virtual channel $VC_{ACB}$ on virtual path $VP_{AC}$ between station A and station C as shown in FIG. 21C. Also, since MP connection information F5 is generated by station C and sent to station B, virtual path $VP_{CB}$ and virtual channel $VC_{CB}$ are set up between station C and station B as shown in FIG. 6.

Thus, after this multipoint connection processing has been performed, the data information that is sent from station A is sent to station C through a single virtual channel $VC_{AC}$ between station A and station C. Thanks to the data information copying function provided by station C, this data information is copied corresponding to the number of subscribers requested MP connection accommodated on station C, and the portion to be transmitted to station B is also copied. The copied data information is then sent to d-Sub and e-Sub, which are the subscribers requested MP connection of station C, and is sent to station B through virtual channel $VC_{CB}$ between station C and station B. Furthermore, at station B, by means of its data information copying function, the data information is copied in accordance with the number of subscribers requested MP connection accommodated on station B, and is thus sent to the subscribers requested MP connection accommodated on station B(b-Sub and c-Sub).

That is, with this embodiment of the present invention, the data information for sending to station B is sent from station C, since data information sent to station C through virtual channel $VC_{AC}$ is copied, without needing to set up a further virtual channel $VC_{ACB}$ on virtual path $VP_{AC}$ between station A and station C as happened in the prior art example shown in FIG. 6. The bandwidth capacity of virtual path $VP_{AC}$ between station A and station C can therefore be restricted, enabling delay of data information transmission, lowering of transmission quality and increased load on the ATM switch (station) to be prevented.

FIG. 7 is a flow chart of multipoint connection processing wherein rerouting connection processing is performed according to a second embodiment of the present invention. This flow chart is described with reference to FIG. 8 to FIG. 11 and by comparison with the flow chart of FIG. 1, which is the first embodiment.

Figure 8A:
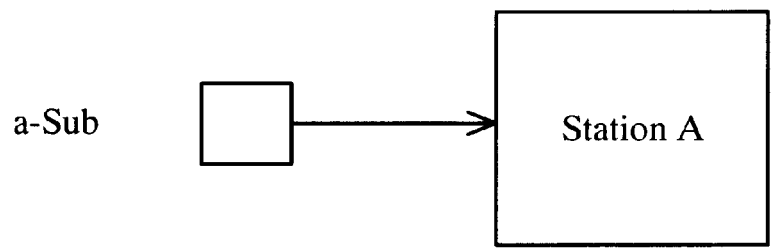
FIG. 8 is a view given in explanation of rerouting connection processing according to the second embodiment of the present invention (number 1)
Figure 8B:
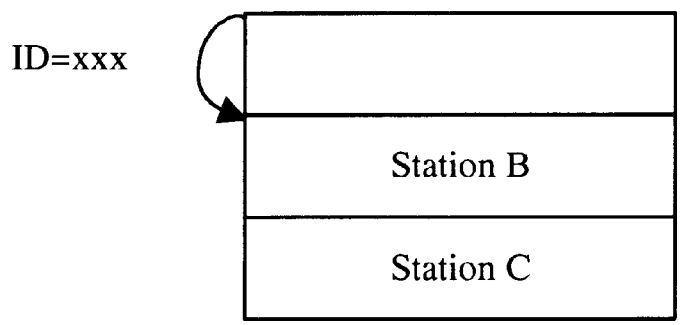

In step S20, just as in step S10 of FIG. 1, MP connection information is received from a subscriber. For example, as shown in FIG. 8A, station A receives an MP connection request from a subscriber a-Sub accommodated on station A. In step S21, after receiving the MP connection information, the station uses this MP connection information to get the information of the station requested MP connection. Specifically, as shown in FIG. 8B, station A gets the information of the station requested MP connection from the multi-connection information F6 of its own means for data storage, but, unlike step S11 of FIG. 1, it does not get the information of the subscriber requested MP connection.

Then, the station that has acquired the information of station requested MP connection generates information for connection to each station requested MP connection and sends this to each station requested MP connection. Specifically, as shown in FIG. 9A, MP connection information F7, F8 generated by station A is sent respectively to station B and station C. In contrast to the first embodiment, MP connection information F7, F8 does not contain the information of the subscriber requested MP connection but, instead, as shown in FIG. 9B, contains the prescribed ID information.

Then, in step S23, if a station requested MP connection is detected that is not capable of sending MP connection information, in step S24, a station that has received MP connection information selects MP connection information with a station requested MP connection that has transmitted normally as relay station. Specifically, if, as shown in FIG. 9A, sending of MP connection information to station B was not possible due to a circuit malfunction, if sending to station C was possible, station C is selected as relay station.

At this point, the MP connection information F8 has already been transmitted to station C. Consequently, the prescribed connection information is sent to subscribers requested MP connection (d-Sub and e-Sub) using the information of the subscriber requested MP connection contained in MP connection information F8; furthermore, as shown in FIG. 6, a virtual path $VP_{AC}$ is set up between station A and station C and a single virtual channel $VC_{AC}$ is set up thereon.

Figure 10A:
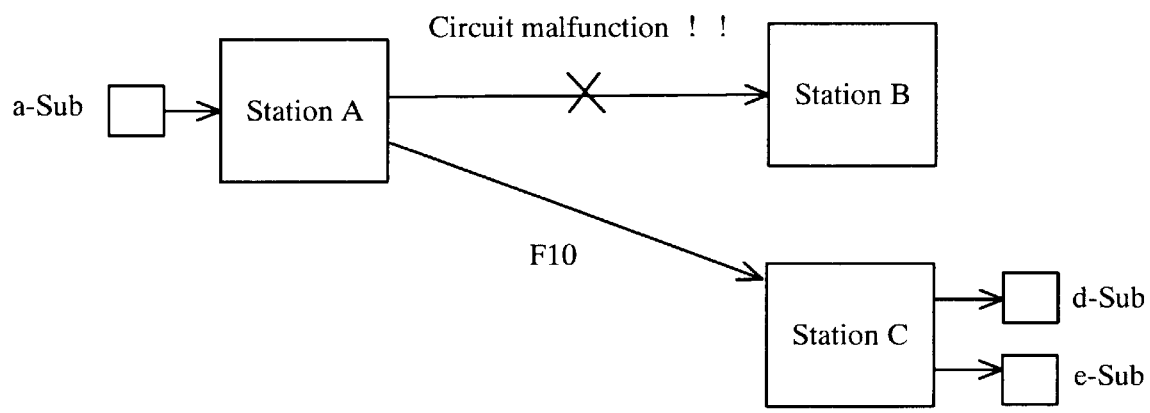
FIG. 10 is a view given in explanation of rerouting connection processing according to the second embodiment of the present invention (number 3)
Figure 10B:
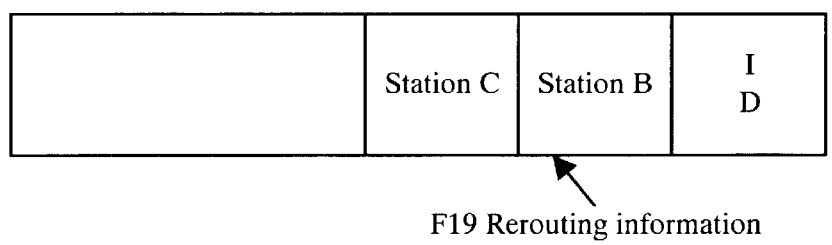

Then, in step S25, MP connection information to which has been added rerouting information for sending MP connection information from the relay station to a relay station that has not been able to send MP connection information is sent to the relay station. Specifically, as shown in FIG. 10B, station A sends MP connection information F10 obtained by adding rerouting information F19 consisting of the information of the station requested MP connection which is the destination (station B) to MP connection information F8 to station C, which is the relay station.

Figure 11A:
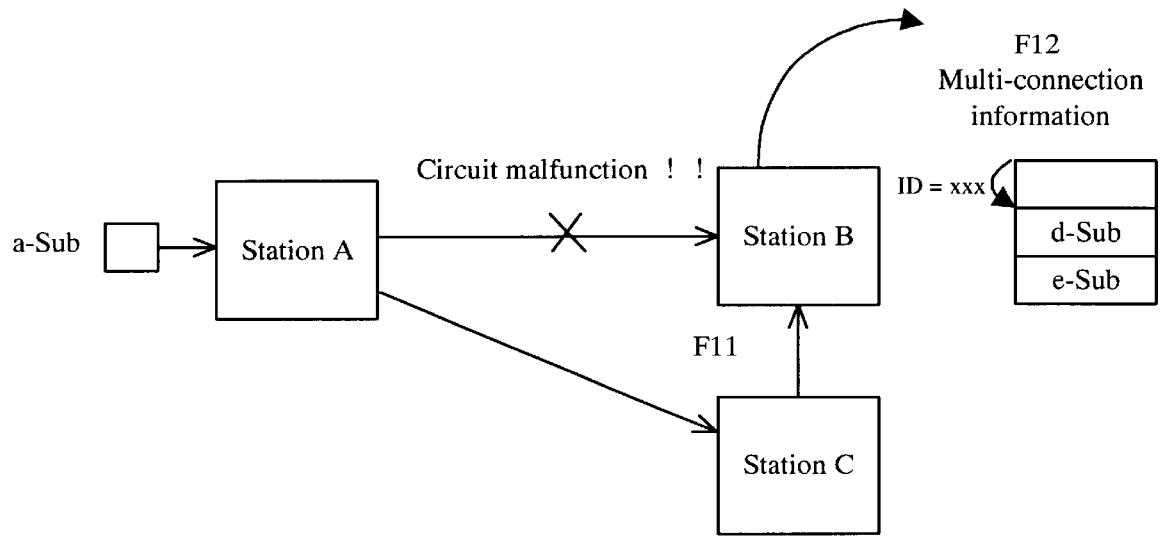
FIG. 11 is a view given in explanation of rerouting connection processing according to the second embodiment of the present invention (number 4)
Figure 11B:
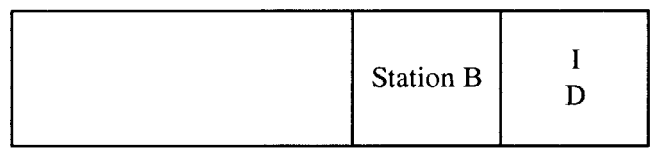

Next, in step S26, the relay station, using this rerouting information F19, generates MP connection information to a station requested MP connection constituting an destination and sends this to the destination which is a station requested MP connection. Specifically, station C constituting the relay station when it receives this MP connection information F10, determines that this is MP connection information relating to the same multipoint connection as the MP connection information F8 that was already sent, from the number of the originating subscriber that requested multipoint connection (5) and the ID information indicating the multipoint connection destination (2) contained in this MP connection information F10, just as in the case of the first embodiment. Then, station C extracts the rerouting information F19 i.e. the information of the station requested MP connection of the destination (in this case, station B) from this MP connection information F10, and generates MP connection information F11 containing ID information and the information of the station requested MP connection (station B) as shown in FIG. 11B, and sends this to station B, as shown in FIG. 11A.

Further, in step S27, the station requested MP connection of the destination, now that it has received the MP connection information from the relay station, gets the information of the subscriber requested MP connection by reading the multi-connection information from the means for data storage at its own station. Specifically, after normal reception of MP connection information F11, station B uses the ID information contained in MP connection information F11 to read the multi-connection information F12 from the means for data storage managed by station B; station B thereby gets the information of the subscriber requested MP connection (b-Sub and c-Sub) as shown in FIG. 11A.

Then, in step S28, the station requested MP connection that is the destination uses the information of the subscriber requested MP connection that it has acquired to send connection information to the subscribers requested MP connection. Specifically, station B, after it has normally received MP connection information F11, sends prescribed connection information to subscribers requested MP connection (b-Sub and c-Sub) accommodated thereon. As this point, as shown in FIG. 6, a virtual path $VP_{CB}$ and a single virtual channel $VC_{CB}$ are set up between station C and station B.

Consequently, in this embodiment also, since, when MP connection information F10 is received by station C, station C determines that this MP connection information F10 is MP connection information relating to the same multipoint connection as MP connection F8, a fresh virtual channel $VC_{ACB}$ is not set up on virtual path $VP_{AC}$ between station A and station C as shown in FIG. 21C. Instead, MP connection information F11 is generated by station C and sent to station B, so, as shown in FIG. 6, a virtual path $VP_{CB}$ and virtual channel $VC_{CB}$ are set up between station C and station B.

Then, in the same way as in the first embodiment, the data information that is sent to station A after multipoint connection processing has been performed is sent to station C through a single virtual channel $VC_{AC}$ between station A and station C. Of this data information, the portion to be sent to station B is copied by station C. This copied data information is then sent to station B through virtual channel $VC_{CB}$ between station C and station B. That is, the bandwidth capacity of virtual path $VP_{AC}$ between station A and station C can be restricted, thereby preventing delay of data information transfer, lowering of transmission quality and increase of the load on the ATM switch (station).

Figure 12:
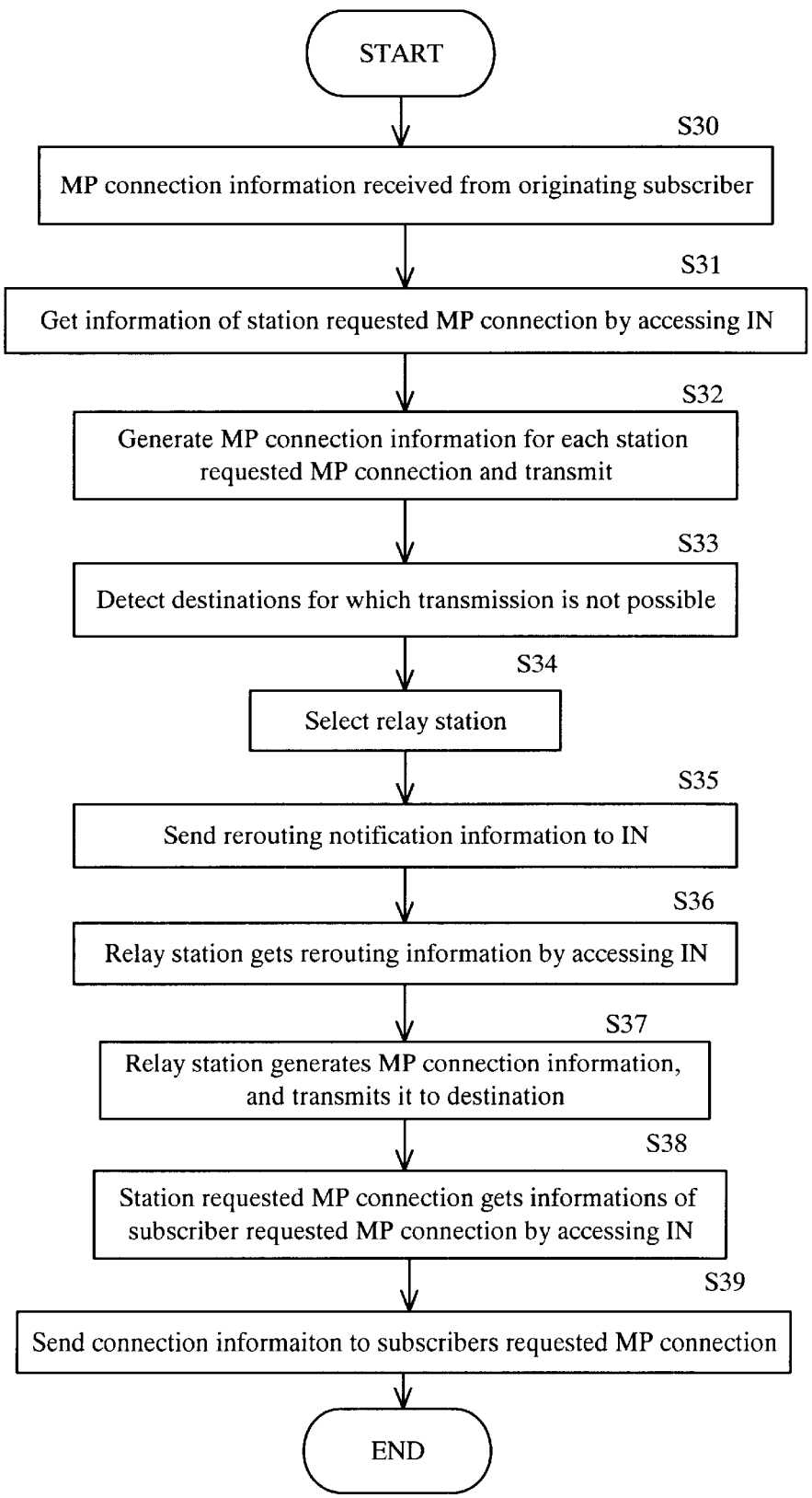
FIG. 12 is a flow chart of multipoint connection processing in which rerouting connection processing is performed according to a third embodiment of the present invention.

FIG. 12 is a flow chart of multipoint connection processing whereby rerouting connection processing is performed according to a third embodiment of the present invention. This flow chart will be described with reference to FIG. 13 to FIG. 20.

In the multipoint connection processing of this embodiment, the IN management information constituted by the database of the host computer IN (Intelligent Network) that manages the communication network is made use of. The multi-connection information of each station is stored in this IN management information instead of in the means for data storage of station A, station B and station C.

Figure 13:
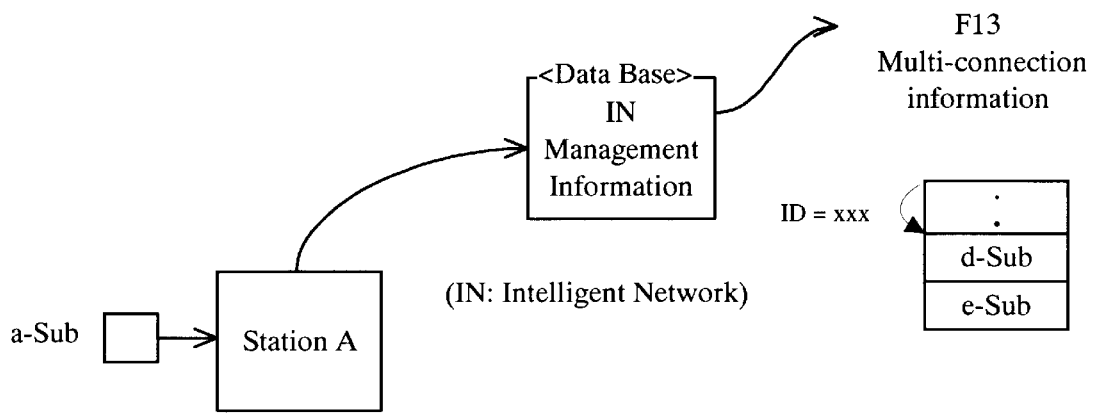
FIG. 13 is a view given in explanation of rerouting connection processing according to the third embodiment of the present invention (number 1)

In step S30, the MP connection information from an originating subscriber is received in the same way as in step S10 of FIG. 1 and step S20 of FIG. 7. For example, as shown in FIG. 13, station A receives an MP connection request from a subscriber a-Sub accommodated on station A.

Figure 14A:
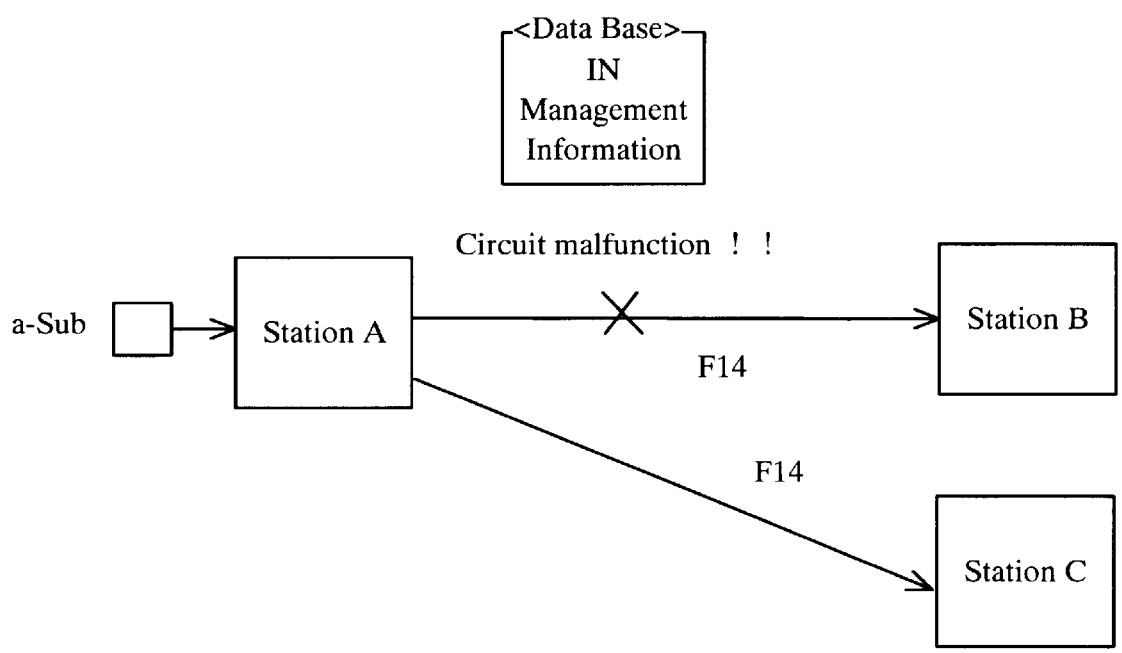
FIG. 14 is a view given in explanation of rerouting connection processing according to the third embodiment of the present invention (number 2)
Figure 14B:

In step S31, the station that has received the MP connection information gets the information of the station requested MP connection from the multi-connection information of its own station by accessing the host computer. Specifically, as shown in FIG. 13, station A that has received MP connection information from subscriber a-Sub reads multi-connection information F13 by accessing host computer IN and thereby gets the information of the station requested MP connection (station B and station C in FIG. 13) corresponding to the ID information Next, in step S32, the station that has acquired the information of station requested MP connection generates MP connection information to each station requested MP connection and sends this to each station requested MP connection. Specifically, as shown in FIG. 14A, station A uses the information of the station requested MP connection that it has acquired to generate MP connection information F14 containing the ID information as shown in FIG. 14B and sends this to stations requested MP connection (station B and station C in the Figure) corresponding to the information of the station requested MP connection.

Then, in step S33, if it is detected that a station requested MP connection has been unable to send MP connection information due for example to a circuit malfunction, in step S34, the originating station selects a station requested MP connection that was able to send MP connection information normally to serve as a relay station. Specifically, as shown in FIG. 14A, if station B cannot send MP connection information to station B due to a circuit malfunction, but it can be sent to station C, station C is selected as relay station.

Figure 15A:
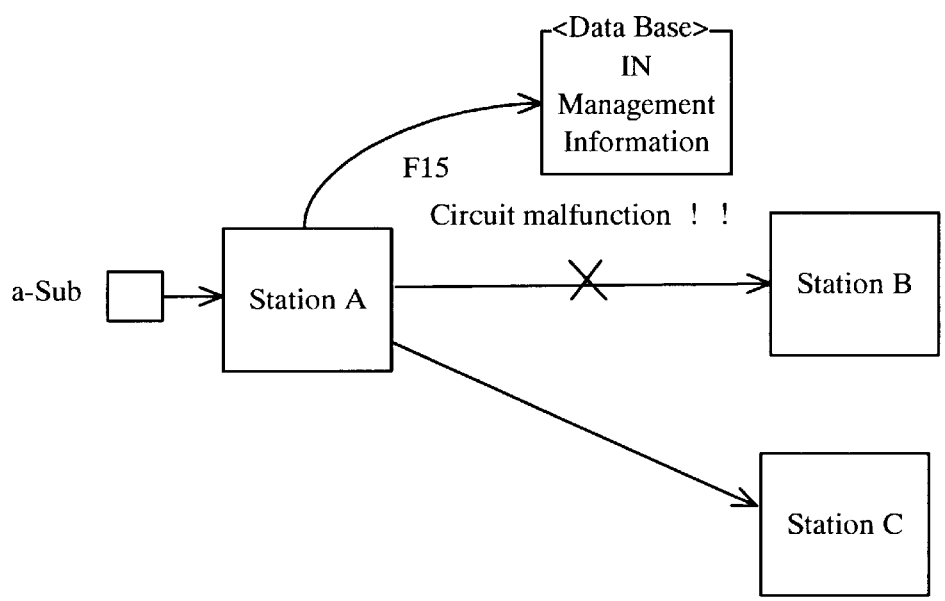
FIG. 15 is a view given in explanation of rerouting connection processing according to the third embodiment of the present invention (number 3)
Figure 15B:
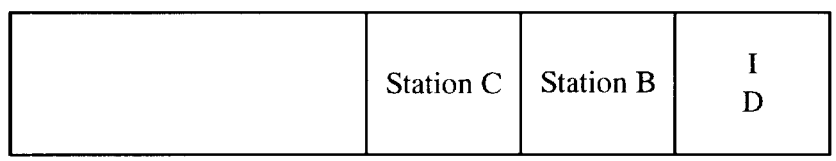

On the other hand, in step S35, the station that has transmitted MP connection information sends to the host computer IN rerouting notification information to the effect that MP connection information destined for the station that did not transmit is to be reroutingly sent from the selected relay station. Specifically, as shown in FIG. 15A, station A sends to host computer IN rerouting notification information F15 to the effect that MP connection information in respect of station B is to be reroutingly sent to station B from station C. As shown in FIG. 15B, rerouting notification information F15 includes the relay station (station C), the transmission destination station (station B), and the ID information.

Figure 16:
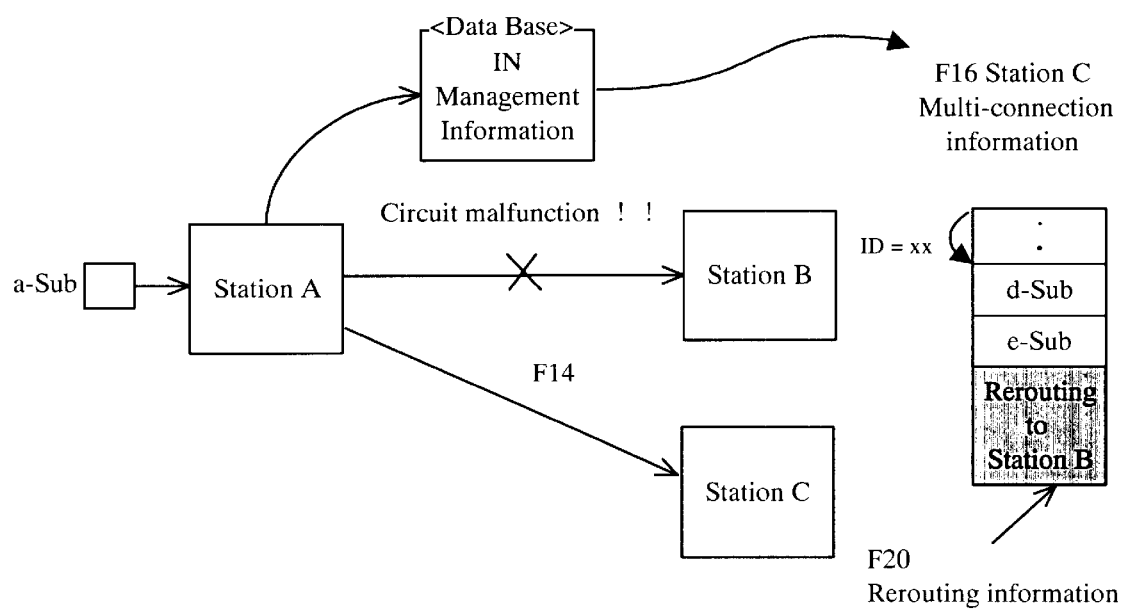
FIG. 16 is a view given in explanation of rerouting connection processing according to the third embodiment of the present invention (number 4)

When host computer IN receives the rerouting notification information F15, as shown in FIG. 16, it adds to the multi-connection information F16 corresponding to the ID information rerouting information F20 to the effect that MP connection information F14 is to be reroutingly sent to station B.

Figure 17:
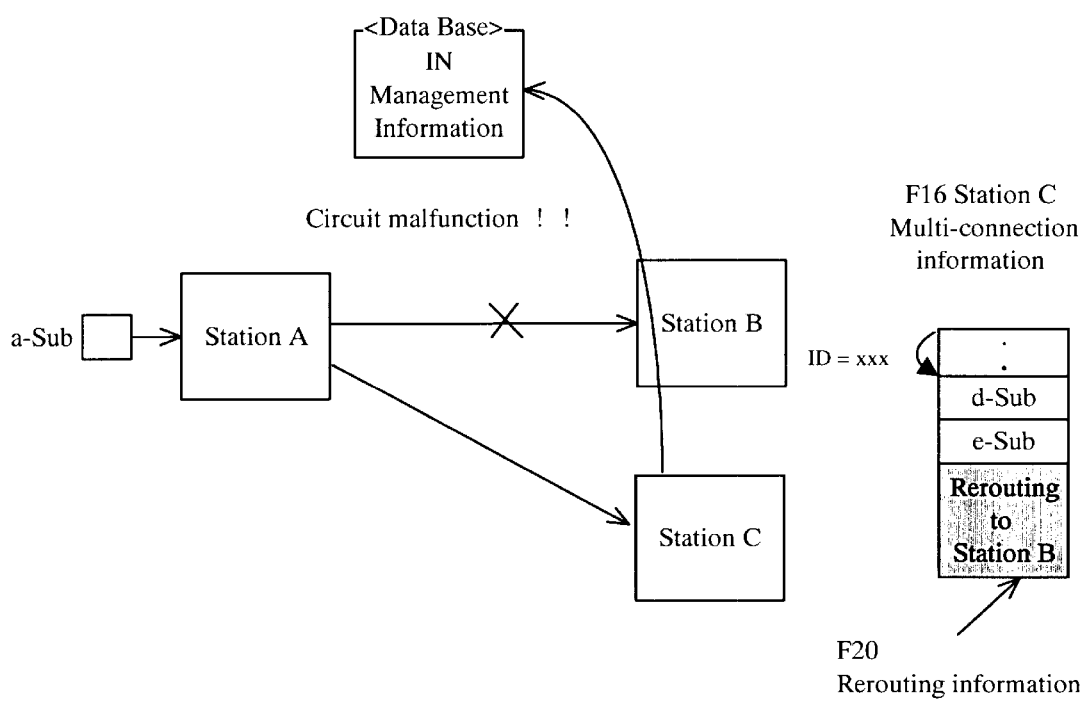
FIG. 17 is a view given in explanation of rerouting connection processing according to the third embodiment of the present invention (number 5)

In step S36, the relay station gets the rerouting information by accessing the host computer IN and reading the multi-connection information F16. Specifically, as shown in FIG. 17, when station C receives MP connection information F14, by accessing host computer IN, it reads the multi-connection information F16 of station C corresponding to the ID contained in this information F14. It then gets the information of the subscriber requested MP connection (subscriber d-Sub and e-Sub) corresponding to this ID and also the rerouting information F20 to station B.

Figure 18:
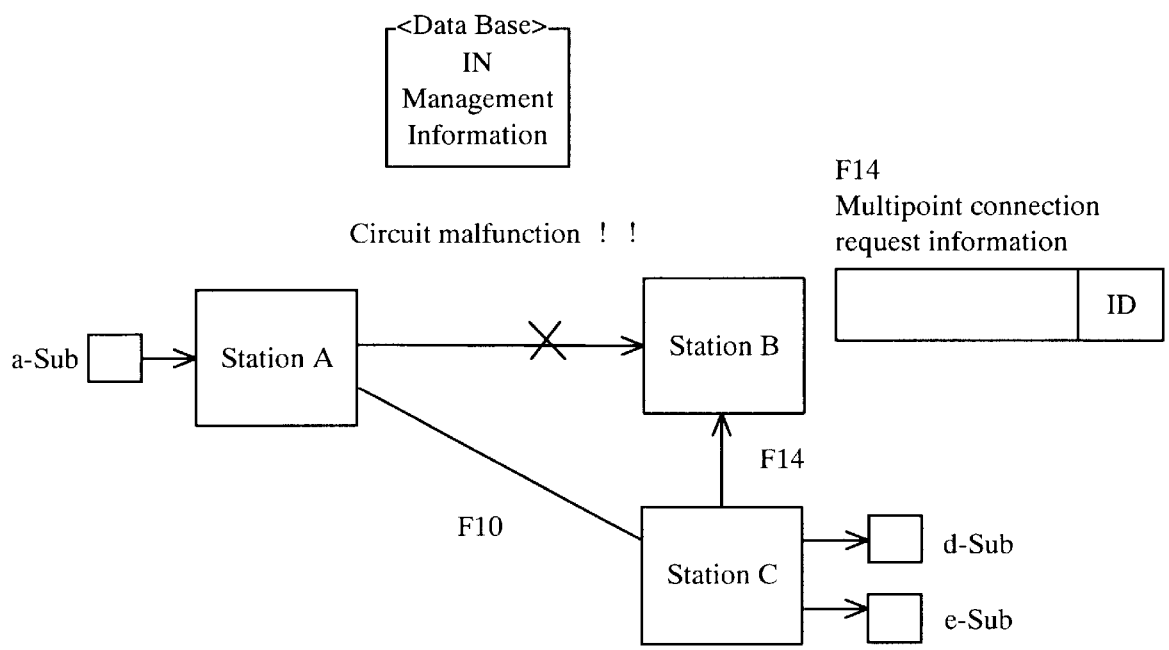
FIG. 18 is a view given in explanation of rerouting connection processing according to the third embodiment of the present invention (number 6)

Furthermore, in step S37, the relay station generates the MP connection information based on this rerouting information F20, and sends this to the destination station requested MP connection. Specifically, as shown in FIG. 18, station C makes a connection request to subscribers requested MP connection (d-Sub and e-Sub) that are accommodated thereon and generates MP connection information F14 shown in FIG. 18, and sends this to station B.

Figure 19:
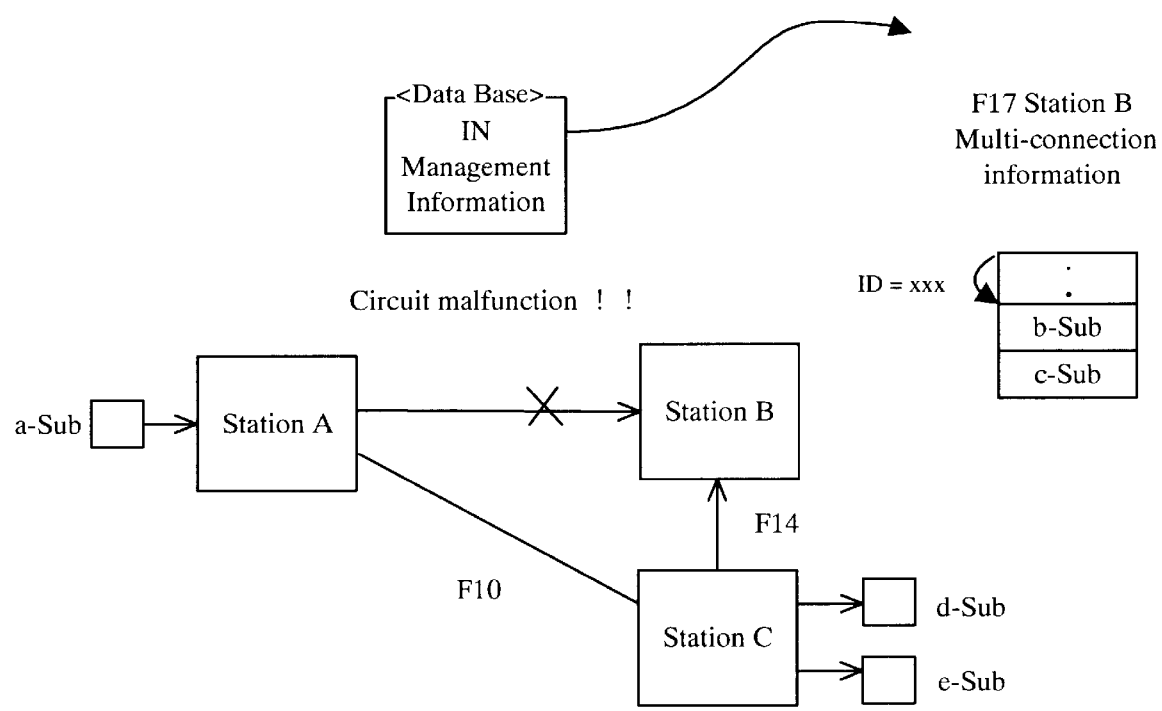
FIG. 19 is a view given in explanation of rerouting connection processing according to the third embodiment of the present invention (number 7)
Figure 20:
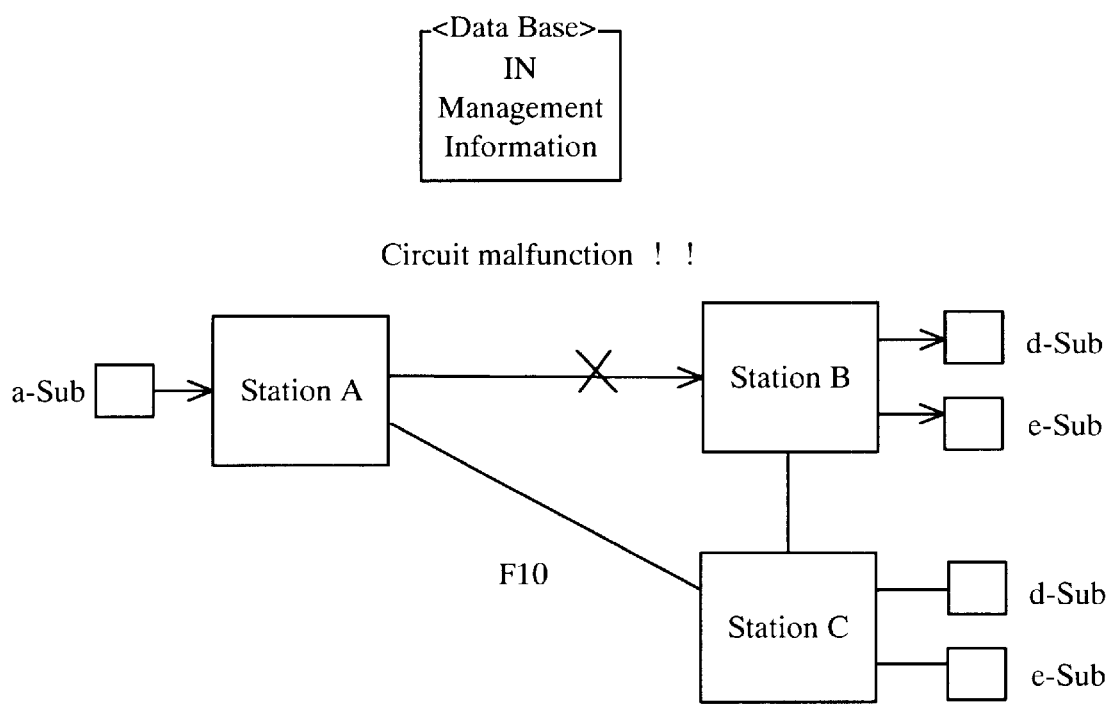
FIG. 20 is a view given in explanation of rerouting connection processing according to the third embodiment of the present invention (number 8)

In step S38, the destination station requested MP connection that has received the MP connection information reads the multi-connection information by accessing host computer IN and reads the information of the subscriber requested MP connection of its own station; in step S39 it then sends the connection information to the subscribers requested MP connection. Specifically, after receiving MP connection information F14, station B, as shown in FIG. 19, reads the multi-connection information F17 of station B corresponding to the ID information contained in this MP connection information F14 by accessing host computer IN, and thereby gets the information of the subscriber requested MP connection (subscriber b-Sub and c-Sub) corresponding to this ID information. It then makes a connection request to these subscribers as shown in FIG. 20.

At this point, a virtual path $VP_{CB}$ and a single virtual channel $VC_{CB}$ are set up between station C and station B as shown in FIG. 6 described above, and, in the same way as described above, the bandwidth capacity of the virtual path $VP_{AC}$ between station A and station C can be restricted since no fresh virtual channel $VC_{ACB}$ for purposes of rerouting connection of station A and station B is set up via station C as described in FIG. 21C on the virtual path $VP_{AC}$ between station A and station C.

The present invention is not restricted to the above embodiments and various alterations and improvements are possible within the scope of the invention as set out in the claims; these are also included in the scope of the present invention.

According to the present invention there is provided an rerouting connection processing method wherein, in multipoint connection processing in a communication network system that is capable of multipoint connection from a single switch (for example station A) to a plurality of other switches (for example station B and station C), if there exists a first other switch (station B) that cannot receive multipoint connection request information from one switch (station A), a second other switch (station C) that is capable of receiving multipoint connection request information from the one switch (station A) generates multipoint connection request information to the first other switch (station B) and sends this information that has been generated to the first other switch (station B); and the first other switch (station B), using the multipoint connection request information from the second other switch (station C), performs the prescribed multipoint connection processing.

In this way, a virtual channel to the first other switch (station B) is not set up on the virtual path between the first switch (station A) and second other switch (station C); a virtual channel is only set up between the second other switch (station C) and first other switch (station B).

The data information to the first other switch (station B) is therefore copied by the copying function of the second other switch (station C) and is sent from the second other switch (station C).

In this way, when data information sent from one switch (station A) is sent to a first other switch (station B) via a second other switch (station C), a virtual channel to send the same data information between the one switch (station A) and the second other switch (station C) in duplicated fashion is not set up; the bandwidth capacity of the virtual path of the one switch (station A) and the second other switch (station C) can thus be restricted, thereby preventing the delay of data information transfer, lowering of transmission quality and increased load of the ATM switches caused by bandwidth capacity being exceeded.

What is claimed is:

1. A method of rerouting connection with a communication network system that is capable of multipoint connection from one switch to a plurality of other switches, if there is a first other switch that cannot receive multipoint connection request information from the one switch, the method comprising the steps of:

receiving in a second other switch first multipoint connection request information sent from the one switch;

generating in the second other switch second multipoint connection request information by using the first multipoint connection request information;

sending the second multipoint connection request information generated in the second other switch to the first other switch; and performing prescribed multipoint connection processing in the first other switch by using the second multipoint connection request information sent from the second other switch;

wherein the first multipoint connection request information includes rerouting information and wherein in the generating step, the second other switch generates the second multipoint connection request information by using the rerouting information; and wherein the rerouting information includes information of a subscriber who has been requested multipoint connection and is accommodated on the first other switch.

2. The method of rerouting connection according the claim 1, wherein the generating step, the second other switch generates the second multipoint connection request information containing the information of the subscriber; and in the performing step, the first other switch performs multipoint connection processing in respect of the subscriber by using the information of the subscriber.

3. The method of rerouting connection according to claim 1, wherein the rerouting information includes information of the first other switch and wherein the first multipoint connection request information further includes identification information that identifies a subscriber that has been requested multipoint connections;

in the generating step, the second other switch generates the second multipoint connection request information containing the identification and in the performing step, the first other switch gets information of the subscriber corresponding to the identification information from a data storage means of the first other switch and perform multipoint connection processing in respect of the subscriber by using the information of the subscriber.

4. A method of rerouting with a communication network system that is capable of multipoint connection from one switch to a plurality of other switches, if there is a first other switch that cannot receive multipoint connection request information from the one switch, the method comprising the steps of:

receiving in a second other switch first multipoint connection request information sent from the one switch;

generating in the second other switch second multipoint connection request information by using the first multipoing connection request information sending the second multipoint connection request information generated in the second other switch to the first other switch; and performing prescribed multipoint connection processing in the first other switch by using the second multipoint connection request information sent from the second other switch;

sending rerouting information for generating the second multipoint connection request information to a database that manages the communication network system from the one switch; and wherein in the generating step, the second other switch gets rerouting information from the database and generates the second multipoint connection request information by using the rerouting information.

5. The method of rerouting connection according to claim 4, wherein the first multipoint connection request information includes identification information that identifies a subscriber that has been requested multipoint connection, and in the generating step, the second other switch generates the second multipoint connection request information including the identification information, and in the performing step ,the first other switch gets the information of the subscriber corresponding to the identification information from the database and performs multipoint connection processing in respect of the subscriber by using the information of the subscriber.

6. The method of rerouting connection according to claim 1 or 2 through 5, wherein the one switch and the other switches are asynchronous transfer mode switches.

7. A communication network system that is capable of multipoint connection, comprising;

one switch sending first multipoint connection request information;

a first other switch receiving the first multipoint connection request information;

a database managing the communication network, and receiving rerouting information which is sent from the one switch when the first other switch cannot receive the first multipoint connection request information; and a second other switch receiving the first multipoint connection request information, and generating second multipoint connection request information by using the first multipoint connection request information and sending the second multipoint connection request information to the first other switch, if the first other switch cannot receive the first multipoint connection request information from the one switch;

the first other switch further performing prescribed multipoint connection processing by using the second multipoint connection request information sent from the second other switch instead of the first multipoint connection request information;

wherein the one switch sends rerouting information for generating the second multipoint connection request information to a database that manages the network system; and wherein the second other switch gets the rerouting information from the database and generates the second multipoint connection request information by using the rerouting information.

8. The communication network system according to claim 7, wherein the first multipoint connection request information includes identification information that identifies a subscriber that has been requested multipoint connection, the second other switch generates the second multipoint connection request information including the identification information, and the first other switch gets from the database the information of the subscriber corresponding to the identification information and performs the multipoint connection processing in respect of the subscriber by using the information of the subscriber.

9. The method of rerouting connection according to claim 1, wherein the one switch and the other switches are asynchronous transfer mode switches.

10. The communication network system according to claim 7, wherein the one switch and the other switches are asynchronous transfer mode switches.

11. A communication network system that is capable of multipoint connection, comprising:

one switch sending first multipoint connection request information;

a first other switch receiving the first multipoint connection request information; and a second other switch receiving the first multipoint connection request information, and generating second multipoint connection request information by using the first multipoint connection request information and sending the second multipoint connection request information to the first other switch, if the first other switch cannot receive the first multipoint connection request information from the one switch;

the first other switch further performing prescribed multipoint connection processing by using the second multipoint connection request information sent from the second other switch instead of the first multipoint connection request information;

wherein the first multipoint connection request information includes rerouting information for generating the second multipoint connection request information; and wherein the second other switch generates the second multipoint connection request information by using the rerouting information;

wherein the rerouting information includes information of the first other switch, wherein the first multipoint connection request information includes identification information that identifies a subscriber that has been requested multipoint connection, the second other switch generates the second multipoint connection request information containing the identification information;

the first other switch gets the information of the subscriber corresponding to the identification information from a data storage means of the first other switch and performs multipoint connection processing in respect of the subscriber by using the information of the subscriber.

12. A communication network system that is capable of multipoint connection, comprising:

one switch sending first multipoint connection request information;

a first other switch receiving the first multipoint connection request information; and a second other switch receiving the first multipoint connection request information, and generating second multipoint connection request information by using the first multipoint connection request information-and sending the second and multipoint connection request information to the first other switch, if the first other switch cannot receive the first multipoint connection request information from the switch, the first other switch further performing prescribed multipoint connection processing by using the second multipoint connection request information sent from the second other switch instead of the first multipoint connection request information;

wherein the first multipoint connection request information includes rerouting information for generating the second multipoint connection request information;

wherein the second other switch generates the second multipoint connection request information by using the rerouting information; and wherein the rerouting information includes information of a subscriber who has been requested multipoint connection and is accommodated on the first other switch.

13. The communication network system according to claim 12, wherein the second other switch generates the second multipoint connection request information containing the information of the subscriber; and the first other switch performs multipoint connection processing in respect of the subscriber by using the information of the subscriber.

14. The communication network system according to claim 12 or 13 through 8, wherein the one switch and the other switches are asynchronous transfer mode switches.

* * * * *